United States Patent
Song et al.

(10) Patent No.: US 9,548,582 B2
(45) Date of Patent: Jan. 17, 2017

(54) PULSE WIDTH STRETCHER AND CHIRPED PULSE AMPLIFIER INCLUDING THE SAME

(71) Applicant: ELECTRONICS AND TELECOMMUNICATIONS RESEARCH INSTITUTE, Daejeon (KR)

(72) Inventors: Dong Hoon Song, Daejeon (KR); Moon Youn Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/950,574

(22) Filed: Nov. 24, 2015

(65) Prior Publication Data

US 2016/0149368 A1  May 26, 2016

(30) Foreign Application Priority Data

Nov. 26, 2014  (KR) .................. 10-2014-0166594
Nov. 3, 2015   (KR) .................. 10-2015-0153791

(51) Int. Cl.
  *H01S 3/00*  (2006.01)
  *H01S 3/08*  (2006.01)
  *H01S 3/094* (2006.01)
  *H01S 3/23*  (2006.01)

(52) U.S. Cl.
  CPC .......... *H01S 3/0057* (2013.01); *H01S 3/08004* (2013.01); *H01S 3/094038* (2013.01); *H01S 3/2341* (2013.01)

(58) Field of Classification Search
  CPC . H01S 3/0057; H01S 3/2341; H01S 3/094038
  See application file for complete search history.

(56) References Cited

U.S. PATENT DOCUMENTS

| 4,928,316 A | 5/1990 | Heritage et al. |
| 5,701,327 A | 12/1997 | Cunningham et al. |
| 5,734,503 A | 3/1998 | Szipocs et al. |
| 5,960,016 A | 9/1999 | Perry et al. |
| 8,796,614 B2 * | 8/2014 | Song .................. H01J 27/24 250/251 |

(Continued)

FOREIGN PATENT DOCUMENTS

| KR | 10-2006-0114330 A | 11/2006 |
| KR | 10-1219444 B1 | 1/2013 |

(Continued)

OTHER PUBLICATIONS

C.V.Shank et al., "Subpicosecond kilowatt pulses from a mode-locked cw dye laser", Applied Physics Letters, Apr. 15, 1974, pp. 373-375, vol. 24, No. 8, American Institute of Physics.

(Continued)

*Primary Examiner* — Dung Nguyen (57) ABSTRACT

Provided are a pulse width stretcher and a chirped pulse amplifier including the same. The pulse width stretcher includes first and second multiple reflection mirrors, and a pulse group-delay dispersion block disposed between the first and second multiple reflection mirrors and configured to refract a pulse laser beam to stretch a pulse width of the pulse laser beam.

14 Claims, 8 Drawing Sheets

(56) References Cited

U.S. PATENT DOCUMENTS

2013/0003763 A1    1/2013  Myung et al.
2013/0299716 A1   11/2013  Song et al.
2014/0135561 A1*   5/2014  Song .................. G21B 3/006
                                                      600/1

FOREIGN PATENT DOCUMENTS

WO    WO 03/096495 A1   11/2003
WO    WO 2005/050795     6/2005

OTHER PUBLICATIONS

Dong Hoon Song et al., "Dynamics of Sub-microjoule Femtosecond Pulse Formation in a Negative Dispersion Regime", Journal of the Korean Physical Society, Sep. 2012, pp. 730-734, vol. 61, No. 5.
D H Song et al., "A compact Kerr-lens mode-locked Ti:sapphire oscillator with 330 nJ soliton-like pulses", Laser Physics Letters, 2013, pp. 1-5, vol. 10, No. 6, IOP Publishing.
Donna Strickland et al., "Compression of Amplified Chirped Optical Pulses", Optics Communications, Dec. 1, 1985, pp. 219-221, vol. 56, No. 3, Elsevier Science Publishers B.V.
D.E. Spence et al., "60-fsec pulse generation from a self-mode-locked Ti:sapphire laser", Optics Letters, Jan. 1, 1991, pp. 42-44, vol. 16, No. 1, Optical Society of America.

* cited by examiner

PULSE WIDTH STRETCHER AND CHIRPED PULSE AMPLIFIER INCLUDING THE SAME

CROSS-REFERENCE TO RELATED APPLICATIONS

This U.S. non-provisional patent application claims priority under 35 U.S.C. §119 of Korean Patent Application Nos. 10-2014-0166594, filed on Nov. 26, 2014, and 10-2015-0153791, filed on Nov. 3, 2015, the entire contents of which are hereby incorporated by reference.

BACKGROUND

The present disclosure herein relates to an optical amplifier, and more particularly, to a pulse width stretcher that stretches the pulse width of a pulse laser beam, and a chirped pulse amplifier including the same.

In the mid-1980s, there was an important advance of optical technology that overcomes the output power limit of a pulse laser beam according to the damage threshold of a gain medium. That is a chirped pulse amplification technique. The chirped pulse amplification technique may provide a pulse laser beam having output power significantly higher than a general pulse amplification technique. A conventional chirped pulse amplifier may generate a pulse laser beam having maximum output power lower than or equal to about 1 GW. The chirped pulse amplifier may control the pulse width of a pulse laser beam to minimize the effect of the damage threshold of an optical medium. Thus, the chirped pulse amplifier may generate a pulse laser beam having maximum output power equal to higher than about 1 TW.

SUMMARY

The present disclosure provides a pulse width stretcher that has multiple paths of a pulse laser beam.

The present disclosure also provides a pulse width stretcher that may maximize spatial efficiency, and a chirped pulse amplifier including the same.

An embodiment of the inventive concept provides pulse width stretchers including a first multiple reflection mirror comprising a first large area mirror and a first small area mirror in the first large area mirror, the first large area mirror reflecting a pulse laser beam; a second multiple reflection mirror comprising a second large area mirror and a second small area mirror in the second large area mirror, the second large area mirror disposed to face the first large area mirror; and a pulse group-delay dispersion block disposed between the first multiple reflection mirror and the second multiple reflection mirror, and configured to refract the pulse laser beam to stretch a pulse width of the pulse laser beam.

In an embodiments of the inventive concept, a chirped pulse amplifier includes an oscillator configured to generate a pulse laser beam; a pulse width compressor separated from the oscillator and configured to compress a pulse width of the pulse laser; a pulse amplifier disposed between the pulse width stretcher and the oscillator and configured to amplify intensity of the pulse laser beam; and a pulse width stretcher disposed between the pulse amplifier and the oscillator, and configured to stretch the pulse width of the pulse laser beam. The pulse width stretcher includes a first multiple reflection mirror comprising a first large area mirror and a first small area mirror in the first large area mirror, the first large area mirror reflecting the pulse laser beam; a second multiple reflection mirror comprising a second large area mirror a second small area mirror in the second large area mirror, the second large area mirror disposed to face the first large area mirror; and a pulse group-delay dispersion block disposed between the first multiple reflection mirror and the second multiple reflection mirror, and configured to refract the pulse laser beam to stretch the pulse width of the pulse laser beam.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept are described below in detail with reference to the accompanying drawings. The effects and features of the inventive concept, and implementation methods thereof will be clarified through following embodiments to be described in detail with reference to the accompanying drawings. However, the inventive concept is not limited to embodiments to be described below but may also be implemented in other forms. Rather, these embodiments are provided so that this disclosure can be thorough and complete and fully convey the scope of the inventive concept to a person skilled in the art, and the inventive concept is only defined by the scopes of claims. The same reference numerals throughout the disclosure refer to the same components.

The terms used herein are only for explaining embodiments and not intended to limit the inventive concept. The terms in a singular form in the disclosure also include plural forms unless otherwise specified. The terms used herein "comprises" and/or "comprising" do not exclude the presence or addition of one or more additional components, steps, operations and/or elements other than the components, steps, operations and/or elements that are mentioned. Also, the terms a chamber, a thin film, and coating in the disclosure may be understood as general semiconductors and device terms. Since the following description presents an exemplary embodiment, the reference numerals presented according to the order of the description are not limited to the order.

Figure 1:
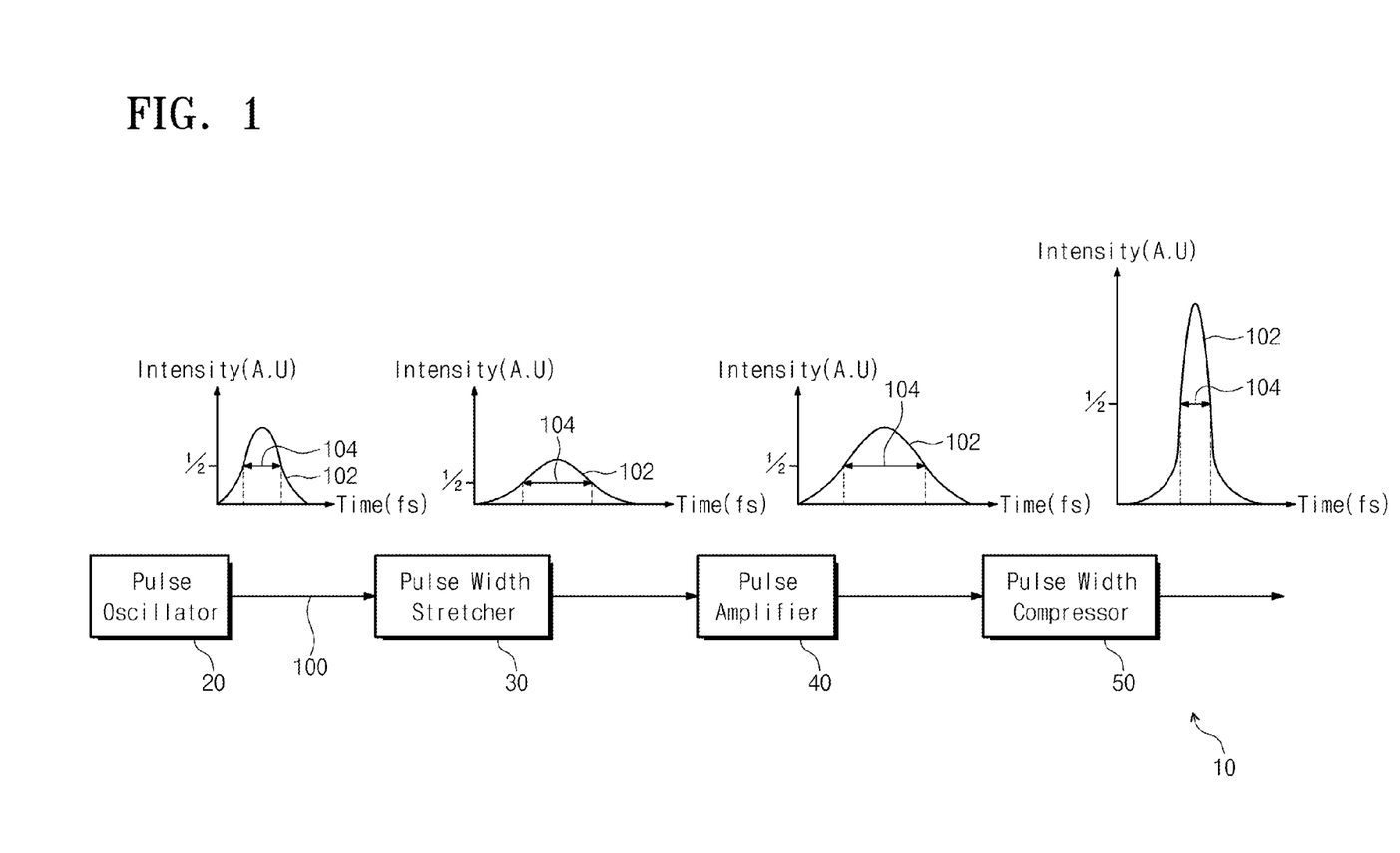
FIG. 1 shows a chirped pulse amplifier according to the inventive concept.

FIG. 1 shows a chirped pulse amplifier 10 according to the inventive concept.

Referring to FIG. 1, the chirped pulse amplifier 10 may include a pulse oscillator 20, a pulse width stretcher 30, a pulse amplifier 40, and a pulse width compressor 50. The pulse oscillator 20 may generate a pulse laser beam 100. For example, the pulse laser beam 100 may produce an ultra-short (picosecond or femtosecond) pulse 102. The pulse width stretcher 30 may stretch the pulse width 104 of the pulse laser beam 100. The pulse width 104 may be defined as a time interval that intensity and/or amplitude become ½ at the rise time and fall time of the pulse 102. The intensity of the pulse 102 may vary at the pulse width stretcher 30, the pulse amplifier 40, and the pulse width compressor 50. The pulse width stretcher 30 may stretch the pulse width 104 at each wavelength range of the pulse laser beam 100. The intensity of the pulse 102 may decrease. For example, the pulse width stretcher 30 may decrease the intensity of the pulse laser beam 100 to be lower than or equal to the damage threshold of a second gain medium 46 (in FIG. 6) of the pulse amplifier 40. The pulse amplifier 40 may amplify the intensity of the pulse laser beam 100. The pulse width compressor 50 may compress the pulse width 104 of the pulse laser beam 100. For example, the intensity of the pulse laser beam 100 at the pulse width compressor 50 may increase by about $10^5$ to $10^6$ times or more than that of the pulse laser beam 100 at the pulse oscillator 20.

Figure 2:
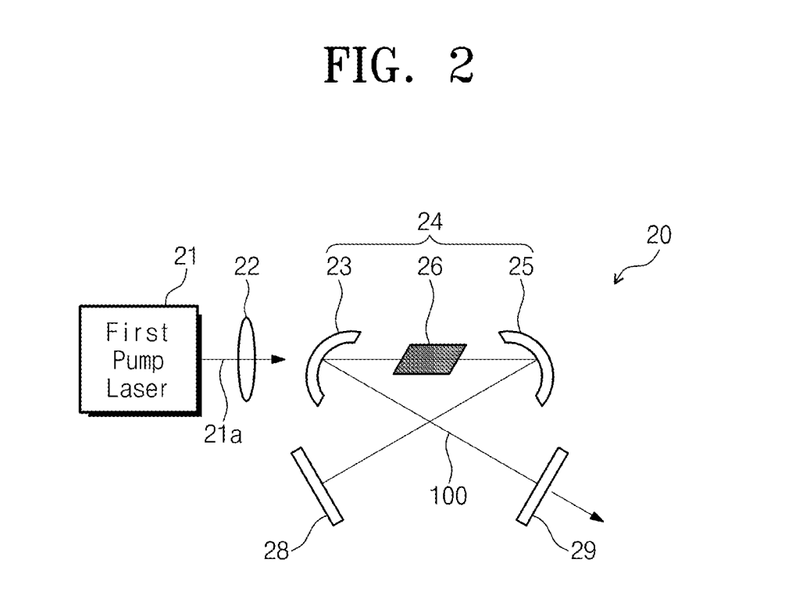
FIG. 2 shows an example of a pulse oscillator in FIG. 1.

FIG. 2 shows an example of the pulse oscillator 20 in FIG. 1.

Referring to FIG. 2, the pulse oscillator 20 may include a first pump laser 21, a first resonator 24, a first chirped mirror 28, and a first output mirror 29. The first pump laser 21 may generate a first pump light 21a. The first pump light 21a may be provided to the first resonator 24 by a pump light focusing lens 22. The first resonator 24 and the first chirped mirror 28 may generate the pulse laser beam 100 from the pump light 21a. For example, the first resonator 24 may include first and second concave mirrors 23 and 25, and a first gain medium 26. The first and second mirrors 23 and 25 may reflect the pulse laser beam 100. Alternatively, the first and second mirrors 23 and 25 may amplify the intensity of the pulse laser beam 100. The first gain medium 26 may be disposed between the first and second concave mirrors 23 and 25. The first gain medium 26 may oscillate the pulse laser beam 100. The first chirped mirror 28 may be disposed outside the extended line of the first and second concave mirrors 23 and 25 and the first gain medium 26. For example, the pulse laser beam 100 may be transmitted to between the second concave mirror 25 and the first chirped mirror 28. The first chirped mirror 28 may generate the pulse 102 of the pulse laser beam 100. The first concave mirror 23 may provide the pulse laser beam 100 to the first output mirror 29. The first output mirror 29 may output the pulse laser beam 100 to the pulse width stretcher 30.

Figure 3:
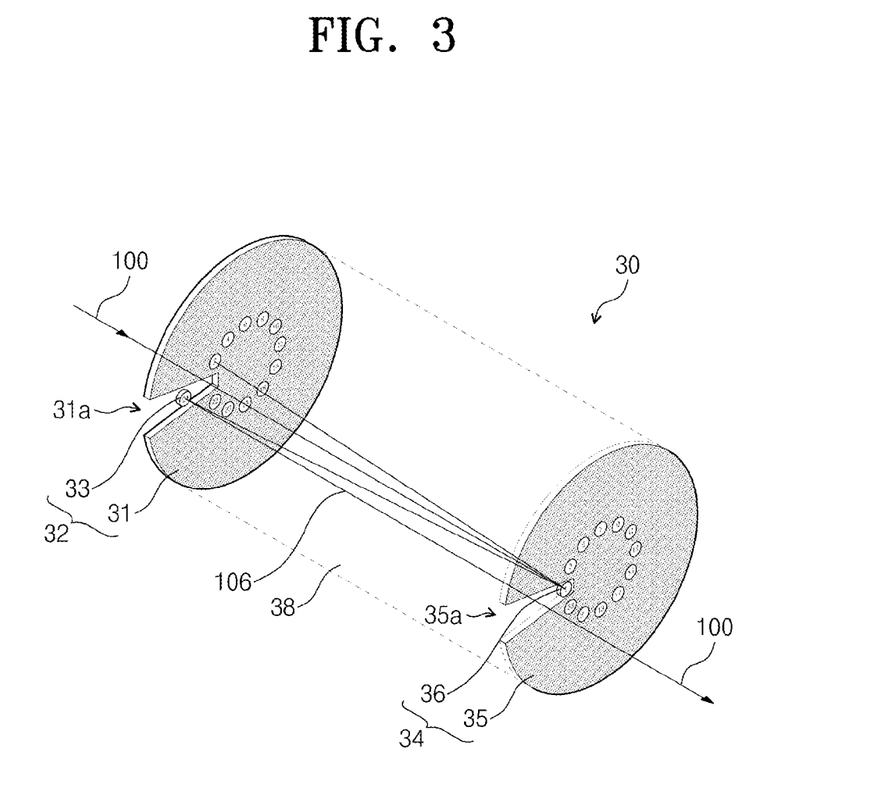
FIGS. 3 and 4 are exemplary perspective and side views of a pulse width stretcher in FIG. 1, respectively.
Figure 4:
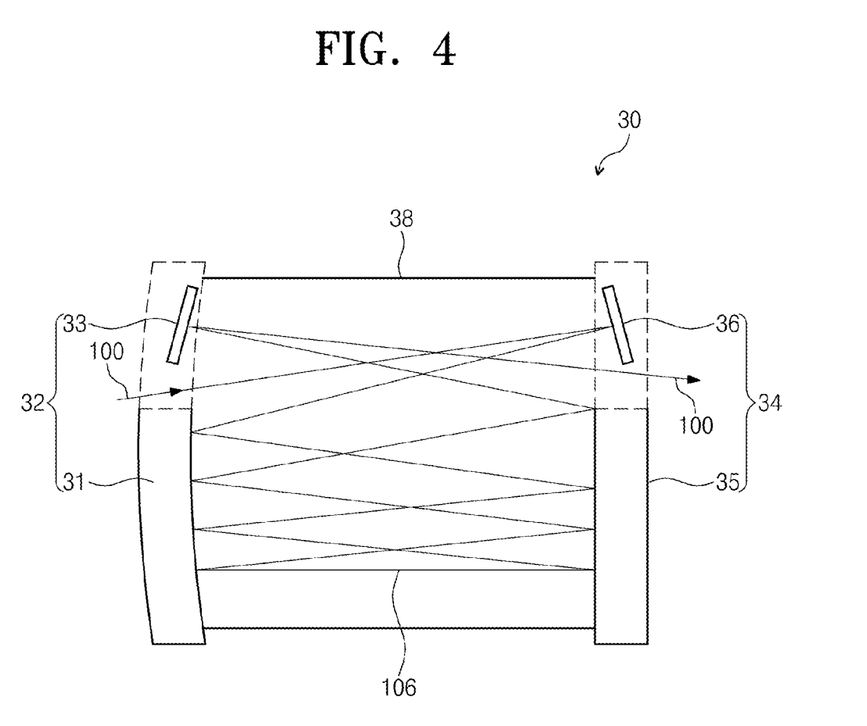

FIGS. 3 and 4 show an example of the pulse width stretcher 30 in FIG. 1.

Referring to FIGS. 3 and 4, the pulse width stretcher may include a first multiple reflection mirror 32, a second multiple reflection mirror 34, and a group-delay dispersion block 38. The first and second multiple reflection mirrors 32 and 34 may reflect the pulse laser beam 100 many times. The group-delay dispersion block 38 may be disposed between the first and second multiple reflection mirrors 32 and 34. The group-delay dispersion block 38 may increase the pulse width 104 of the pulse laser beam 100.

The first and second multiple reflection mirrors 32 and 34 may be apart from each other. The first and second multiple reflection mirrors 32 and 34 may perform multiple reflections on the pulse laser beam 100. For example, the first and second multiple reflection mirrors 32 and 34 may reflect the pulse laser beam 100 about 24 times. "1" to "24" of FIG. 3 may correspond to the reflection points of the pulse laser beam 100. The distance between the first and second multiple reflection mirrors 32 and 34 may be about 33.5 cm. The pulse laser beam 100 may travel a distance of about 8 m (24*33.5 cm). The pulse laser beam 100 may pass through the group-delay dispersion block 38. The group-delay dispersion block 38 may have the multipath 106 of the pulse laser beam 100. The multipath 106 may not intersect with the group-delay dispersion block 38 and may be spatially parallel thereto. The multipath 106 may extend the transmission and/or refraction length of the pulse laser beam 100 in the group-delay dispersion block 38 without the length extension of the group-delay dispersion block 38. Thus, the first and second multiple reflection mirrors 32 and 34 and the group-delay dispersion block 38 may maximize the spatial efficiency of the pulse width stretcher 30.

The first multiple reflection mirror 32 may include a first large area mirror 31 and a first small area mirror 33. According to an example, the first large area mirror 31 may include a concave mirror. The first large area mirror 31 may have the radius of curvature of about 5 m. The first large area mirror 31 may have a first side hole 31a. The first small area mirror 33 may be disposed in the first large area mirror 31. The first small area mirror 33 may be disposed in the first side hole 31a. For example, the first small area mirror 33 may include a flat mirror. The pulse laser beam 100 may pass the first multiple reflection mirror 32 through the first side hole 31a.

The second multiple reflection mirror 34 may include a second large area mirror 35 and a second small area mirror 36. According to an example, the second large area mirror 35 may include a flat mirror. The second large area mirror 35 may a second side hole 35a. The second small area mirror 36 may have a smaller area than the second large area mirror 35. The second small area mirror 36 may be disposed in the second side hole 35a. For example, the second small area mirror 36 may include a flat mirror. The pulse laser beam 100 may pass the second multiple reflection mirror 34 through the second side hole 35a.

The group-delay dispersion block 38 may be disposed between the first and second multiple reflection mirrors 32 and 34. According to an example, the group-delay dispersion block 38 may include a dielectric cylinder. The group-delay dispersion block 38 may include silicon oxide. The group-delay dispersion block 38 may have a positive group-delay dispersion value for the pulse laser beam 100. For example, the time required for transmission may vary at each wavelength of the pulse laser beam 100, when the pulse laser beam 100 passes through the group-delay dispersion block 38. The reason is that the group-delay dispersion block 38 has different refractive indexes for each wavelength of the pulse laser beam 100. The group-delay dispersion block 38 may have the group velocity dispersion of the wavelength of the pulse laser beam 100. The long wavelength of the pulse laser beam 100 may be stretched toward the front portion of the pulse 102 with respect to a time axis and the short wavelength of the pulse laser beam 100 may be stretched toward the rear portion of the pulse 102. Thus, the pulse width 104 may be stretched over the entire wavelength of the pulse laser beam 100.

The group velocity dispersion may correspond to the phase shift of the pulse laser beam 100 in the group-delay dispersion block 38. When the phase shift of the pulse laser beam 100 is the function $\psi(\omega)$ (for the frequency component of the pulse laser beam 100, the passage time $\tau(\omega)$ of the pulse laser beam 100 of each frequency component may be expressed by Equation (1) as follows:

$$r(\omega) = \frac{d\psi}{d\omega}. \tag{1}$$

When Taylor's expansion is performed on the central frequency of the pulse laser beam 100, τ(ω) may be expressed by Equation (2) as follows:

$$\psi(\omega) = \psi_0 + \frac{d\psi}{d\omega}\bigg|_{\omega_0}(\omega - \omega_0) + \frac{1}{2}\frac{d^2\psi}{d\omega^2}\bigg|_{\omega_0}(\omega - \omega_0)^2\ldots. \quad (2)$$

The first term $\psi_0$ is the initial phase of the pulse laser beam 100 and may be the absolute phase of the central frequency of the pulse laser beam 100. The second term $$\frac{d^2\psi}{d\omega^2}\bigg|_{\omega_0}(\omega - \omega_0)^2$$

may be the group velocity of the pulse laser beam 100, i.e., a time taken for the pulse laser beam 100 of the central frequency to pass the group-delay dispersion block 38. The third term $$\frac{1}{2}\frac{d^2\psi}{d\omega^2}\bigg|_{\omega_0}(\omega - \omega_0)^2$$

is a term representing the linear variation of τ(ω) according to the frequency of the pulse laser beam 100 and may be a group delay dispersion (GDD) value. The GDD may be in proportion to the linear variation of τ(ω) according to the frequency of the pulse laser beam 100. For example, the larger the GDD is, the greater the linear variation of τ(ω) may be. The group-delay dispersion block 38 may determine the GDD of the pulse laser beam 100. The entire group-delay dispersion of the pulse laser beam 100 may correspond to the multiplication of the GDD of the group-delay dispersion block 38 and the travel distance of the pulse laser beam 100 in the group-delay dispersion block 38. Although not shown, the function ψ(ω) may include third order dispersion to Nth order dispersion. When the GDD is calculated, the third order dispersion to the Nth order dispersion may have little effect on the variation of the group velocity of the pulse laser beam 100.

The pulse 102 of the pulse laser beam 100 may have bell-shaped Gaussian distribution. The stretched pulse width Δt of the pulse laser beam 100 by the group-delay dispersion block 37 may be calculated from Equation (3) and is represented by the GDD and the input pulse width $\tau_0$:

$$\Delta t = r_0\sqrt{1 + \frac{(4\log(2)GDD)^2}{r_0^2}} \quad (3)$$

where the input pulse width $\tau_0$ may correspond to $$\frac{c}{\lambda_0^2}\Delta\lambda \times \Delta t = 0.441$$

according to uncertainty principle. $\lambda_0$ may be the central wavelength of the pulse laser beam 100. C may be the speed of light, 3×108 m/s. Δλ may be the full width half maximum of the wavelength of the pulse laser beam 100. The stretched pulse width Δt may be calculated by the central wavelength $\lambda_0$ and the full width half maximum Δλ of the pulse laser beam 100. For example, when the pulse laser beam 100 having a central wavelength $\lambda_0$ of about 800 nm and full width half maximum Δλ of about 100 nm passes the group-delay dispersion block 38, the pulse width 104 of the pulse laser beam 100 may be stretched to about 388 picosecond (ps). Thus, the pulse width stretcher 30 may use the multipath 106 of the group-delay dispersion block 38 to effectively stretch the pulse width 104.

Figure 5:
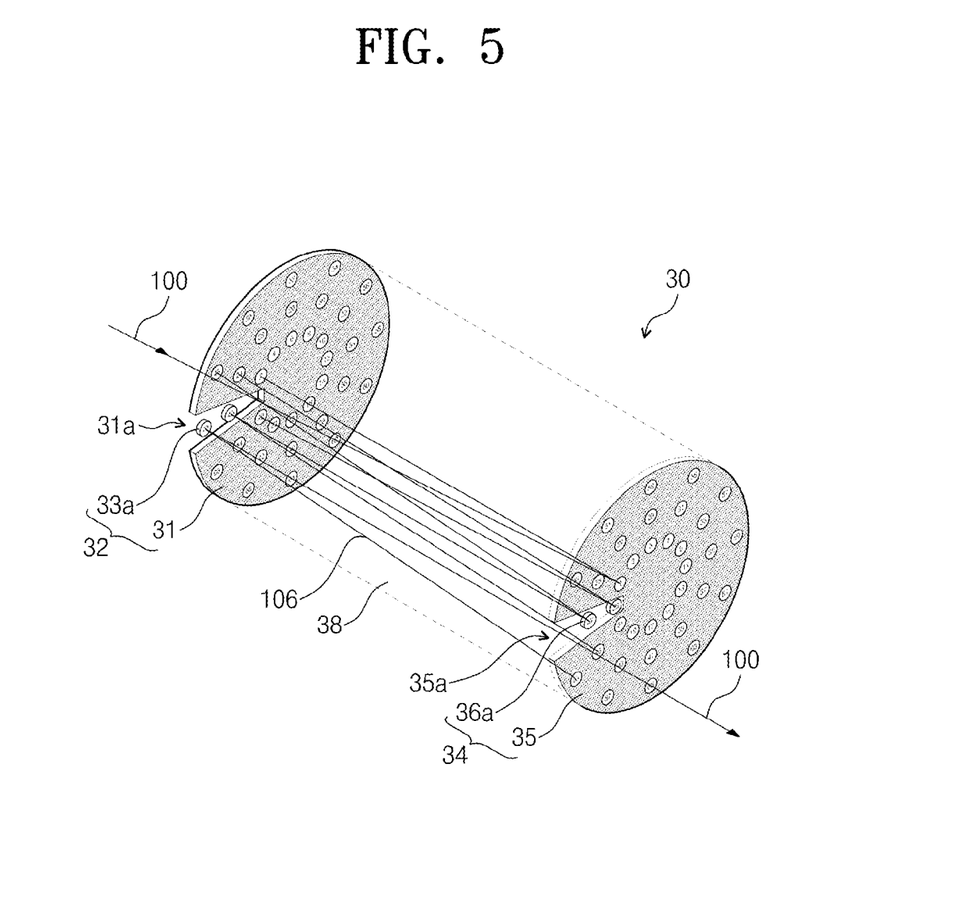
FIG. 5 is an exemplary perspective of a pulse width stretcher in FIG. 1.

FIG. 5 shows an example of the pulse oscillator 20 in FIG. 1.

Referring to FIG. 5, the first multiple reflection mirror 32 may include a plurality of first small area mirrors 33. The second multiple reflection mirror 34 may include a plurality of second small area mirrors 35. The first and second large area mirrors 31 and 35 and the group-delay dispersion block 38 may be the same as in FIG. 3.

For example, the first and second multiple reflection mirrors 32 and 34 of the pulse width stretcher 30 may reflect the pulse laser beam 100 about 70 times. "1"-"70" may correspond to the reflection points of the pulse laser beam 100. The pulse laser beam 100 may pass through the group-delay dispersion block 38 seventy-two times. The pulse laser beam 100 may pass about 24 m (72*33.5 cm) in the group-delay dispersion block 38. When the pulse laser beam 100 having a central wavelength $\lambda_0$ of about 800 nm and full width half maximum Δλ of about 100 nm passes 24 m in the group-delay dispersion block 38, the pulse width 104 of the pulse laser beam 100 may be stretched to about 1,164 ps.

Figure 6:
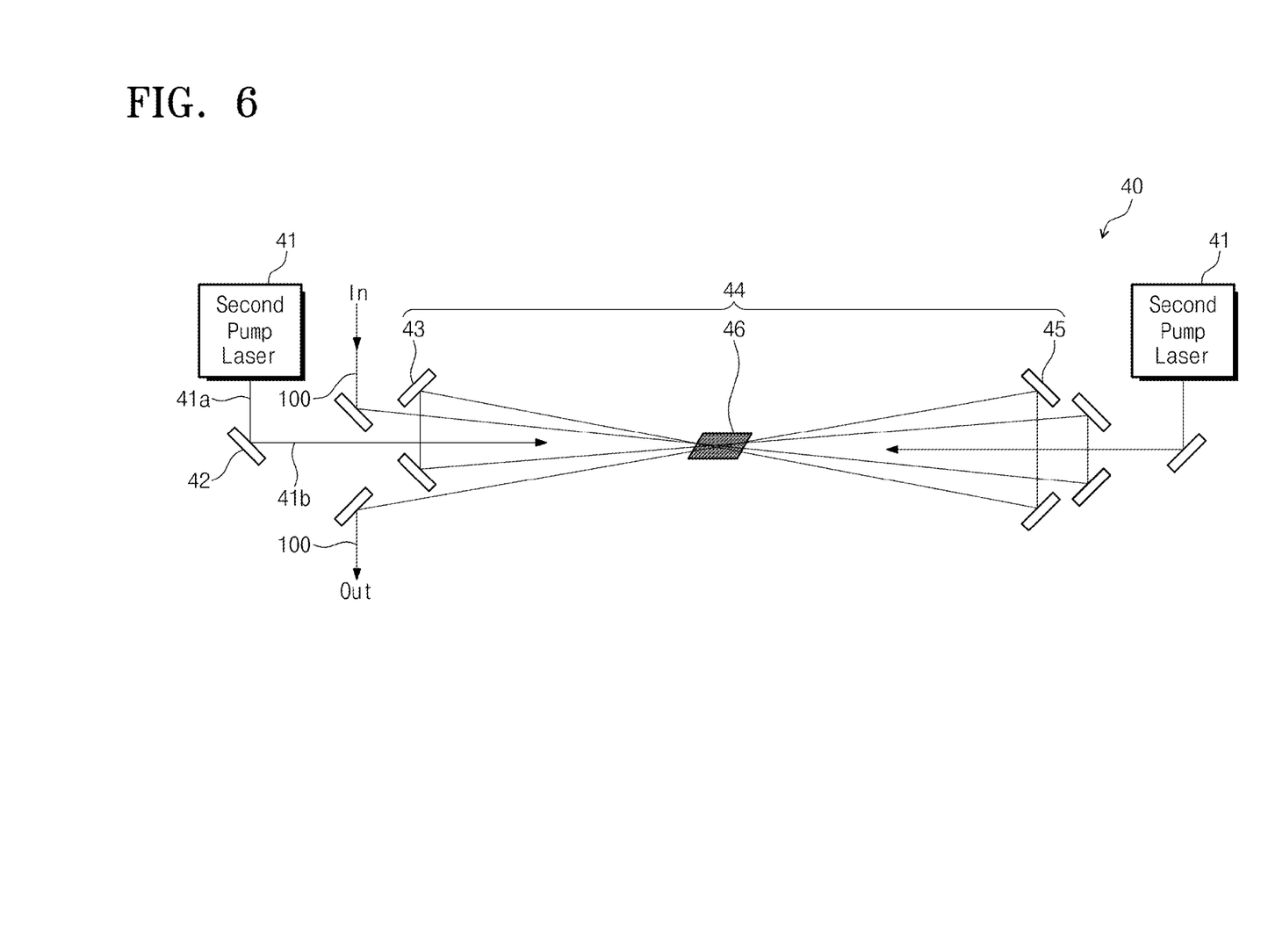
FIG. 6 shows an example of a pulse amplifier in FIG. 1.

FIG. 6 shows an example of the pulse amplifier 40 in FIG. 1.

Referring to FIG. 6, the pulse amplifier 40 may include second pump lasers 41, first mirrors 42, and a second resonator 44. The second pump lasers 41 may be disposed at the opposite sides of the second resonator 44 and the first mirrors 42. The second pump lasers 41 may generate a second pump light 41a. The first mirrors 42 may provide the second pump light 41a to the second resonator 44. The second resonator 44 may amplify the intensity of the pulse laser beam 100. According to an example, the second resonator 44 may include first mirrors 43, second mirrors 45, and the second gain medium 46. The first mirrors 43 and the second mirrors 45 may be disposed so that they face each other. The second gain medium 46 may be disposed between the first mirrors 43 and the second mirrors 45. The second gain medium 46 may include the same material as the first gain medium 26. Each time the pulse laser beam 100 passes through the second gain medium 46, the intensity of the pulse laser beam 100 may gradually increase. On the contrary, the pulse widths 104 of the pulse laser beam 100 in the pulse width stretcher 30 and the pulse amplifier 40 may be the same.

Figure 7:
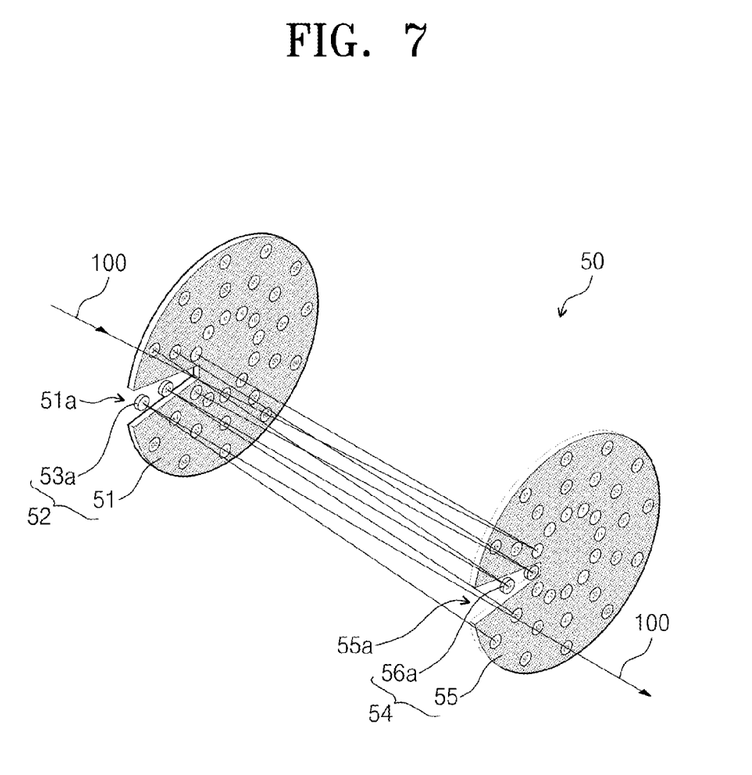
FIGS. 7 and 8 are perspective and side views of a pulse width compressor in FIG. 1, respectively.
Figure 8:
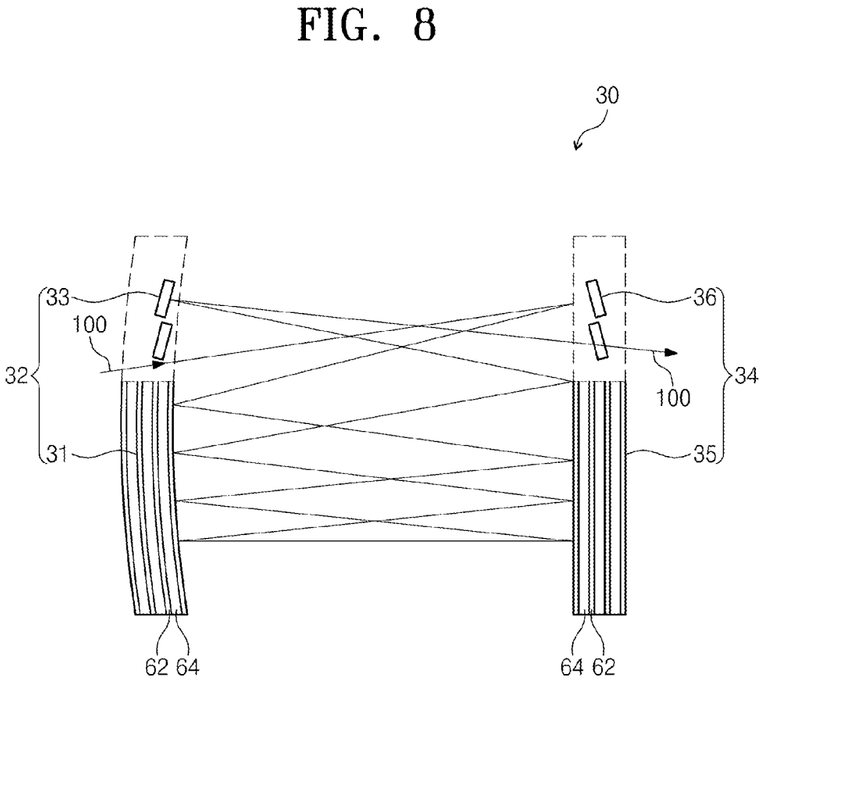

FIGS. 7 and 8 show the pulse width compressor 50 in FIG. 1.

Referring to FIGS. 3, 4, 7, and 8, the pulse width compressor 50 may include third and fourth multiple reflection mirrors 52 and 54. The third and fourth multiple reflection mirrors 52 and 54 may be disposed so that they face each other. According to an example, the third and fourth multiple reflection mirrors 52 and 54 may include group-delay dispersion mirrors that reflect the pulse laser beam 100. The third and fourth multiple reflection mirrors 52 and 54 may have the GDD of the pulse laser beam 100 which is opposite to the GDD of the group-delay dispersion block 38. For example, the third and fourth multiple reflection mirrors 52 and 54 may have negative GDD.

According to an example, each of the third and fourth multiple reflection mirrors 52 and 54 may include low-refractive dielectric layers 62 and high-refractive dielectric layers 64. The low-refractive dielectric layers 62 may have the same refractive index as the group-delay dispersion block 38. The low-refractive dielectric layers 62 may include silicon oxide ($SiO_2$) that has a refractive index of about 1.4. The high-refractive dielectric layers 64 may be disposed between the low-refractive dielectric layers 62. The high-refractive dielectric layers 64 may have a higher refractive index than the low-refractive dielectric layers 62. The high-refractive dielectric layers 64 may include titanium oxide ($TiO_2$) that has a refractive index of about 1.9. The thicknesses of the low-refractive dielectric layers 62 and the high-refractive dielectric layers 64 may be different from each other. For example, the low-refractive dielectric layers 62 may have a thickness of about ¼ compared to the wavelength of the pulse laser beam 100. The high-refractive dielectric layers 64 may have a thickness of about ½ compared to the wavelength of the pulse laser beam 100. When the pulse laser beam 100 has a wavelength of about 800 nm, the low-refractive dielectric layers 62 may have a thickness of about 200 nm and the high-refractive dielectric layers 64 may have a thickness of about 400 nm.

The third multiple reflection mirror 52 may include a third large area mirror 51 and third small area mirrors 53. According to an example, the third large area mirror 51 may include a concave mirror. The third large area mirror 51 may have the same radius of curvature as the first large area mirror 31. The third large area mirror 51 may have a third hole 51a. The third small area mirrors 53 may be disposed in the third large area mirror 51. The third small area mirrors 53 may be fixed in the third hole 51a.

The fourth multiple reflection mirror 54 may include a fourth large area mirror 55 and fourth small area mirrors 56. According to an example, the fourth large area mirror 55 may include a flat mirror. The fourth large area mirror 55 may have a fourth hole. The fourth small area mirrors 56 may be disposed in the fourth large area mirror 55. The fourth small area mirrors 56 may be fixed in the forth hole 55a.

The pulse laser beam 100 may pass through the third hole 51a and be reflected from the fourth large area mirror 55. Alternatively, the pulse laser beam 100 may be reflected from the third small area mirror 53 and then pass through the fourth hole 55a.

For example, when the pulse laser beam 100 has a waveform of about 800 nm, the pulse laser beam 100 may have GDD of about −2,000 $fs^2$ each time it is reflected from the third and fourth large area mirrors 51 and 55 and the third and fourth small area mirrors 53 and 56. The third and fourth large area mirrors 51 and 55 and the third and fourth small area mirrors 53 and 56 may reflect the pulse laser beam 100 about seventy times. The third and fourth large area mirrors 51 and 55 and the third and fourth small area mirrors 53 and 56 may compress the pulse width of the pulse laser beam 100 to GDD of a total of about −144,000 $fs^2$. The pulse width 104 of the pulse laser beam 100 having full width half maximum $\Delta\lambda$ of about 100 nm may be compressed to about −42 ps.

As described above, the pulse width stretcher according to an embodiment of the inventive concept may include the group-delay dispersion block that refracts the pulse laser beam reflected between the first and second multiple reflection mirrors to stretches the pulse width of the pulse laser beam. The group-delay dispersion block may have the multiplath of the pulse laser beam between the first and second multiple reflection mirrors. The first and second multiple reflection mirrors and the group-delay dispersion block may maximize the spatial efficiency of the pulse width stretcher.

While embodiments of the inventive concept are described with reference to the accompanying drawings, a person skilled in the art may understand that the inventive concept may be practiced in other particular forms without changing its technical spirits or essential characteristics. Therefore, the above-described embodiments and applications should be understood as illustrative and not limitative in every aspect.

What is claimed is:

1. A pulse width stretcher comprising:
   a first multiple reflection mirror comprising a first large area mirror and a first small area mirror in the first large area mirror, the first large area mirror reflecting a pulse laser beam;
   a second multiple reflection mirror comprising a second large area mirror and a second small area mirror in the second large area mirror, the second large area mirror disposed to face the first large area mirror; and
   a pulse group-delay dispersion block disposed between the first multiple reflection mirror and the second multiple reflection mirror, and configured to refract the pulse laser beam to stretch a pulse width of the pulse laser beam.

2. The pulse width stretcher of claim 1, wherein the pulse group-delay dispersion block comprises a dielectric cylinder.

3. The pulse width stretcher of claim 2, wherein the dielectric cylinder comprises silicon oxide.

4. The pulse width stretcher of claim 1, wherein the first and second large area mirrors respectively comprise first and second side holes fixing the first and second small area mirrors.

5. The pulse width stretcher of claim 1, wherein the first large area mirror comprises a concave mirror, and
   the second large area mirror comprises a flat mirror.

6. A chirped pulse amplifier comprising:
   an oscillator configured to generate a pulse laser beam;
   a pulse width compressor separated from the oscillator and configured to compress a pulse width of the pulse laser;
   a pulse amplifier disposed between the pulse width stretcher and the oscillator and configured to amplify intensity of the pulse laser beam; and
   a pulse width stretcher disposed between the pulse amplifier and the oscillator, and configured to stretch the pulse width of the pulse laser beam,
   wherein the pulse width stretcher comprises:
   a first multiple reflection mirror comprising a first large area mirror and a first small area mirror in the first large area mirror, the first large area mirror reflecting the pulse laser beam;
   a second multiple reflection mirror comprising a second large area mirror a second small area mirror in the second large area mirror, the second large area mirror disposed to face the first large area mirror; and
   a pulse group-delay dispersion block disposed between the first multiple reflection mirror and the second multiple reflection mirror, and configured to refract the pulse laser beam to stretch the pulse width of the pulse laser beam.

7. The chirped pulse amplifier of claim 6, wherein the pulse width compressor comprises:

a third multiple reflection mirror configured to reflect the pulse laser beam; and a fourth multiple reflection mirror disposed to face the third multiple reflection mirror and configured to reflect the pulse laser beam to the third multiple reflection mirror, wherein the third and fourth multiple reflection mirrors comprise group-delay dispersion mirrors that have a group-delay dispersion (GDD) value opposite to a GDD value of the group-delay dispersion block.

8. The chirped pulse amplifier of claim 7, wherein the group-delay dispersion block comprises a dielectric cylinder, wherein each of the third and fourth multiple reflection mirrors comprises:

low-refractive dielectric layers having a same refractive index as the dielectric cylinder; and high-refractive dielectric layers disposed between the low-refractive dielectric layers and having a higher refractive index than the low-refractive dielectric layers.

9. The chirped pulse amplifier of claim 8, wherein the low-refractive dielectric layer comprises silicon oxide, and the high-refractive dielectric layer comprises titanium oxide.

10. The chirped pulse amplifier of claim 7, wherein the third multiple reflection mirror comprises:

a third large area mirror; and a third small area mirror disposed in the third large area mirror, wherein the fourth multiple reflection mirror comprises:

a fourth large area mirror facing the third large area mirror; and a fourth small area mirror disposed in the fourth large area mirror.

11. The chirped pulse amplifier of claim 7, wherein the third and fourth large area mirrors respectively comprise third and fourth holes which fix the third and fourth small area mirrors.

12. The chirped pulse amplifier of claim 6, wherein the first and second multiple reflection mirrors comprise metal mirrors.

13. The chirped pulse amplifier of claim 6, wherein the pulse oscillator comprises:

a first pump laser configured to generate a first pump light;

a first resonator configured to generate the pulse laser beam from the first pump light; and a chirped mirror configured to chirp the pulse laser beam, wherein the first resonator comprises:

a plurality of concave mirrors; and a first gain medium disposed between the concave mirrors.

14. The chirped pulse amplifier of claim 13, wherein the pulse amplifier comprises:

a second pump laser configured to generate a second pump light; and a second resonator configured to resonate the pulse laser beam with the second pump light to amplify intensity of the pulse laser beam, wherein the second resonator comprises:

a plurality of mirrors; and a second gain medium disposed between the mirrors and having a same material as the first gain medium.

* * * * *